US011537995B2

(12) United States Patent
Alfares

(10) Patent No.: US 11,537,995 B2
(45) Date of Patent: Dec. 27, 2022

(54) METHOD AND SYSTEM FOR CYCLIC SCHEDULING

(71) Applicant: King Fahd University of Petroleum and Minerals, Dhahran (SA)

(72) Inventor: Hesham K. Alfares, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/265,298

(22) Filed: Feb. 1, 2019

(65) Prior Publication Data

US 2020/0250627 A1 Aug. 6, 2020

(51) Int. Cl.
*G06Q 10/10* (2012.01)
*G06F 17/11* (2006.01)

(52) U.S. Cl.
CPC ......... *G06Q 10/1093* (2013.01); *G06F 17/11* (2013.01)

(58) Field of Classification Search
CPC ............................ G06Q 10/1093; G06F 17/11
USPC ........................................................ 708/446
See application file for complete search history.

(56) References Cited

U.S. PATENT DOCUMENTS

| | | | |
|---|---|---|---|
| 6,031,984 A | 2/2000 | Walser | |
| 7,043,446 B1 | 5/2006 | Dietrich et al. | |
| 10,168,674 B1 * | 1/2019 | Buerger | G05B 15/02 |
| 2017/0116551 A1 * | 4/2017 | Kubo | G06Q 10/063116 |

OTHER PUBLICATIONS

Raidl, et al.; Combining (Integer) Linear Programming Techniques and Metaheuristics for Combinatorial Optimization; Studies in Computational intelligence (SCI) 114 ; pp. 31-62 ; 2008; 33 Pages.
Wikipedia; Partition (number theory); Jan. 7, 2019; https://en.wikipedia.org/wiki/Partition_(number_theory); 9 Pages.
Dual Formulation: Linear Programming; https://www.universalalterscherpublications.com/univ/or/ch4/pdex.htm ; 4 Pages.
Alfares; A Dual-based Combinatorial Algorithm for Solving Cyclic Optimization Problems; Recent Patents on Computer Science 5; 2012 Bentham Science Publishers; 9 pages.
Alfares; Efficient optimization of cyclic labor days-off scheduling; OR Spektrum 23 ; pp. 283-294; May 30, 2000; 12 Pages.
Alfares; Dual-based optimization of cyclic four-day workweek scheduling; IMA Journal of Mathematics Applied in Business and Industry 11; pp. 269-283; 2000; 15 Pages.

* cited by examiner

*Primary Examiner* — Tan V Mai
(74) *Attorney, Agent, or Firm* — Oblon, McClelland, Maier & Neustadt, L.L.P.

(57) ABSTRACT

A method, computer software product and system for solving cyclic scheduling problems. Specifically, the present disclosure significantly improves the method in a previous patent (H. K. Alfares, 2011, "Cyclic Combinatorial Method and System", U.S. Pat. No. 8,046,316), by eliminating a time-consuming combinatorial procedure. A procedure is described which significantly decreases the number of iterations, and hence computational time and cost. The processes of the present disclosure have many applications in cyclic workforce scheduling, cyclic transportation system scheduling, cyclic scheduling of data packet transmitting as applied to networks having a plurality of nodes and cyclic production scheduling.

4 Claims, 10 Drawing Sheets

| $m$ | $SV^{(1)}$ | $L_m$ | $m/L_m^{(2)}$ |
|---|---|---|---|
| 1 | Any variable $V_k$ | 1 | 1 |
| 2 | Any 2 variables | 2 | 1 |
| 3 | Any 3 variables | 3 | 1 |
| 4 | $V_k, V_{k+2}, V_{k+4}, V_{k+6}$ | 3 | 4/3 |
| 5 | $V_k, V_{k+1}, V_{k+2}, V_{k+3}, V_{k+5}$ | 4 | 5/4 |
| 5 | $V_k, V_{k+1}, V_{k+3}, V_{k+4}, V_{k+5}$ | 4 | 5/4 |
| 6 | Any 6 variables | 5 | 6/5 |
| 7 | All 7 variables | 5 | 7/5 |

*FIG. 3*

$$A = \begin{bmatrix} 0 & 1 & 1 & 1 & 1 & 1 & 0 \\ 0 & 0 & 1 & 1 & 1 & 1 & 1 \\ 1 & 0 & 0 & 1 & 1 & 1 & 1 \\ 1 & 1 & 0 & 0 & 1 & 1 & 1 \\ 1 & 1 & 1 & 0 & 0 & 1 & 1 \\ 1 & 1 & 1 & 1 & 0 & 0 & 1 \\ 1 & 1 & 1 & 1 & 1 & 0 & 0 \end{bmatrix}$$

FIG. 5

METHOD AND SYSTEM FOR CYCLIC SCHEDULING

BACKGROUND OF THE INVENTION

Technical Field

The present disclosure is directed to a cyclic combinatorial integer linear programming solution method, computer software product and system for solving integer programming problems applicable to integer linear programming (ILP) cyclic scheduling, such as transportation timetabling, employee scheduling, cyclic data packet transmission in a transmission system having a plurality of nodes, and production environments including a plurality of machines.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Cyclic and binary (0-1) matrices are frequently encountered in cost function minimization problems. These matrices have special properties that can be utilized to obtain minimized cost function solutions. Cyclic cost function minimization problems are relevant in many practical applications, especially in transportation timetabling, employee scheduling, cyclic data packet transmission in a transmission system having a plurality of nodes, and production environments including a plurality of machines.

Cyclic cost function minimization models have been extensively used in timetabling applications for public transportation systems.

For example, Heydar et al. described using mixed integer programming to develop cyclic timetables for a single railway track with several stops for the local train. The primary objective was to minimize the cycle time, and the secondary objective was to minimize the total stopping time of the local train. (See Heydar, M., Petering, M. E., & Bergmann, D. R. (2013). "Mixed integer programming for minimizing the period of a cyclic railway timetable for a single track with two train types". Computers & Industrial Engineering, 66(1), 171-185, incorporated herein by reference in its entirety).

Petering et al. formulated a bi-objective mixed-integer LP model that integrated cyclic train timetabling and platform allocation decisions. The model aimed to minimize both the cycle time and the total trip times of all trains in each cycle. (See Petering, M. E., Heydar, M., & Bergmann, D. R. (2015). "Mixed-integer programming for railway capacity analysis and cyclic, combined train timetabling and platforming". Transportation Science, 50(3), 892-909, incorporated herein by reference in its entirety).

Lamorgese et al. considered the problem of generating new train timetables after the expansion of railway networks to satisfy additional demand. The algorithms developed for train dispatching were extended to produce optimum cyclic and non-cyclic train timetables. (See Lamorgese, L., Mannino, C., & Natvig, E. (2017). "An exact micromacro approach to cyclic and non-cyclic train timetabling". Omega, 72, 59-70, incorporated herein by reference in its entirety).

Bocewicz et al. presented a cyclic concurrent process model of a transportation network infrastructure. Constraint programming techniques were used to solve this model, which was used for scheduling multimodal transportation systems composed of buses, trains, trams, and subways. (See Bocewicz, G., Wojcik, R., & Banaszak, Z. (2012). "CP-driven Modelling for Multi-modal Cyclic Transport Systems". IFAC Proceedings Volumes, 45(6), 339-344, incorporated herein by reference in its entirety).

Ibarra-Rojas et al. developed an integer LP model for a multi-period synchronization bus timetabling (MSBT) problem. Assuming each bus line had its own planning periods, the model determined the departure times of all trips at all lines. Metaheuristic methods are used to solve the model, whose objective is to maximize passenger transfers while minimizing bus clustering in the network. (See Ibarra-Rojas, O. J., López-Irarragorri, F., & Rios-Solis, Y. A. (2015). "Multiperiod bus timetabling". Transportation Science, 50(3), 805-822, incorporated herein by reference in its entirety).

Ibarra-Rojas et al. highlighted other applications of cyclic timetabling in public bus transportation systems. (See Ibarra-Rojas, O. J., Delgado, F., Giesen, R., & Muñoz, J. C. (2015). "Planning, operation, and control of bus transport systems: A literature review. Transportation Research Part B: Methodological, 77, 38-75, incorporated herein by reference in its entirety").

Further, cyclic cost function minimization techniques have been used to generate cyclic and rotating employee rosters.

For example, Rocha et al. used integer programming models for cyclic employee scheduling, focused on two sub-problems: the shift (time-of-day) scheduling, and day-off (day-of week) scheduling. The models were applied to two real-life case studies, for a glass industry and a continuous care unit, in addition to 20 known benchmark problems. (See Rocha, M., Oliveira, J. F., & Carravilla, M. A. (2013). "Cyclic staff scheduling: optimization models for some real-life problems". Journal of Scheduling, 16(2), 231-242, incorporated herein by reference in its entirety).

Bhattacharya et al. developed an efficient algorithm to solve the (n−2, n) cyclical employee scheduling problem. By solving a series of b-matching problems on a cycle of n nodes, each employee was assigned a set of n−2 consecutive work periods out of a total of n periods. (See Bhattacharya, B., Chakraborty, S., Iranmanesh, E., & Krishnamurti, R. (2014). "The cyclical scheduling problem". Theoretical Computer Science, 555, 9-22, incorporated herein by reference in its entirety).

Xie and Suhl formulated a crew scheduling problem for a public transport bus company as a mixed-integer multi-commodity network flow model. The model, which generated both cyclic and acyclic crew rosters, was used to maximize driver satisfaction and minimize the operational cost. (See Xie, L., & Suhl, L. (2015). "Cyclic and non-cyclic crew rostering problems in public bus transit". OR Spectrum, 37(1), 99-136, incorporated herein by reference in its entirety).

Kiermaier et al. (2016) developed flexible cyclic rosters for an airport ground handling company using a two-stage stochastic programming approach. The model provided responsiveness to demand variation, by considering seven types of demand changes that represent common types of uncertainty in the service industry. (See Kiermaier, F., Frey, M., & Bard, J. F. (2016). "Flexible cyclic rostering in the service industry". IIE Transactions, 48(12), 1139-1155, incorporated herein by reference in its entirety).

Additionally, cyclic cost function minimization methods are frequently found in manufacturing applications, such as cyclic scheduling in job shops and flow shops.

Levner et al. analyzed the computational complexity of cyclic scheduling models, focusing on cyclic job shop scheduling, cyclic flow shop scheduling, cyclic robot scheduling, and cyclic project scheduling. Levner shows that most of these cyclic scheduling problems and their different versions are NP-hard and NP-complete. (See Levner, E., Kats, V., de Pablo, D. A. L., & Cheng, T. E. (2010). "Complexity of cyclic scheduling problems: A state-of-the-art survey". Computers & Industrial Engineering, 59(2), 352-361, incorporated herein by reference in its entirety).

NP-hardness (non-deterministic polynomial-time hardness), in computational complexity theory, is the defining property of a class of problems of high computational complexity. Polynomial time is the time required for a computer to solve a problem, where this time is a simple polynomial function of the size of the input function. NP is a complexity class that represents the set of all decision problems for which the instances where the answer is "yes" have proofs that can be verified in polynomial time. NP-Complete is a complexity class which represents the set of all problems X in NP for which it is possible to reduce any other NP problem Y to X in polynomial time.

Kechadi et al. developed a recurrent neural network methodology for cyclic job shop scheduling. The objective was to minimize the cycle time of the schedule, in order to maximize the utilization of the manufacturing resources. (See Kechadi, M. T., Low, K. S., & Goncalves, G. (2013). "Recurrent neural network approach for cyclic job shop scheduling problem". Journal of Manufacturing Systems, 32(4), 689-699, incorporated herein by reference in its entirety).

Zhou et al. formulated a mixed integer programming (MIP) model for the cyclic robotic flow shop scheduling problem. A robot moved items sequentially between several machines, where time window constraints defined the processing time bounds on each machine. (See Zhou, Z., Che, A., & Yan, P. (2012). "A mixed integer programming approach for multi-cyclic robotic flowshop scheduling with time window constraints". Applied Mathematical Modelling, 36(8), 3621-3629, incorporated herein by reference in its entirety).

Flores-Tlacuahuac and Grossmann simultaneously optimized the cyclic scheduling and control of multi-item production in chemical reactors. A mixed-integer dynamic optimization (MIDO) model represented the dynamic transitions between products and the continuous variations across time and space. (See Flores-Tlacuahuac, A., & Grossmann, I. E. (2011). "Simultaneous cyclic scheduling and control of tubular reactors: Parallel production lines). Industrial & Engineering Chemistry Research, 50(13), 8086-8096, incorporated herein by reference in its entirety).

Lefever et al. formulated an integer programming model for the single-vehicle cyclic inventory routing problem, whose continuous relaxation is convex. Given a set of potential retailers for a single manufacturer, the model selected which retailers to supply, and determined the optimum periodic production and distribution schedule to maximize net profit. (See Lefever, W., Aghezzaf, E. H., & Hadj-Hamou, K. (2016). "A convex optimization approach for solving the single-vehicle cyclic inventory routing problem". Computers & Operations Research, 72, 97-106, incorporated herein by reference in its entirety).

U.S. Pat. No. 7,969,985, incorporated herein by reference in its entirety, described a method for cyclic scheduling of packet transporting and receiving. Utilizing neighboring nodes as buffers, the method determined the cyclic downstream and upstream packet transmission through a network of nodes.

U.S. Pat. No. 8,428,991, incorporated herein by reference in its entirety, described a scheduling system based on a computer generated matrix with n/2 rows and 2(n−1) columns for pairing n discrete elements. The system was used to allocate n/2 pairs across (n−1) consecutive time periods according to the specific scheduling requirements.

U.S. Pat. No. 8,788,308, incorporated herein by reference in its entirety, developed a system for constructing and adjusting employee schedules. The system allowed direct interaction between the scheduling software and the employees. A two-way interface delivered schedule data to employees and also allowed employees to provide input and choose from available options.

U.S. Pat. No. 9,595,016, incorporated herein by reference in its entirety, presented a method for dynamic workforce optimization, which was used when the actual staffing demand in any period was shown to be greater than the predicted demand. The system dynamically generated an optimum agent callout list and wage offer based on the company's business rules.

U.S. Pat. No. 9,807,008, incorporated herein by reference in its entirety, described a method to optimally allocating tasks to be executed among different computing resources, such as servers, based on polling tournaments. Task allocation was subject to several constraints, such as the number and the size of tasks that can be allocated to each resource.

Integer Linear Programming (ILP) problems are known to be difficult to solve (NP hard) and have numerous applications in many areas of cost function minimization, such as cyclic scheduling and network problems. A method for obtaining a solution generally applicable to all integer linear programming (ILP) problems of the form: minimize $Cx$, subject to $Ax \geq r$, where $x \geq 0$ and integer, and A is a cyclic 0-1 matrix is needed.

U.S. Pat. No. 8,046,316, issued to the instant inventor of the present disclosure and incorporated herein by reference in its entirety, described a cyclic combinatorial algorithm for solving the above ILP optimization problem with cyclic 0-1 matrices in several steps. To determine dominant solutions, the method combined partition and cyclic permutation to enumerate all cyclically distinct solutions. First, the dual model of the cyclic optimization problem was constructed. Next, partition and permutation were combined for selecting cyclically distinct subsets out of a number of cyclic objects. Considering the columns (dual variables) of these matrices as cyclic objects, the algorithm was used to select only cyclically distinct combinations of columns (basic dual variables). Subsequently, simple rules were used to identify dominant dual solutions. Finally, the dominant dual solutions can be utilized to either calculate bounds on the objective function, impose efficient cuts on the ILP model, or completely solve the given cyclic 0-1 optimization problem using primal-dual relationships. The process used in U.S. Pat. No. 8,046,316 is not efficient, since the number of cyclically distinct solutions is quite large, even for small-size problems.

One of the steps in U.S. Pat. No. 8,046,316 is a partition/permutation procedure to generate cyclically distinct dual solutions. The present disclosure significantly improves the computational efficiency of the U.S. Pat. No. 8,046,316 patent by replacing the cyclic selection step, involving the combinatorial operations of partition and cyclic permutation, by a step to identify dominant cyclically distinct dual solutions. The method, computer software product and system of the present disclosure significantly decrease the number of iterations, and hence the computational time and effort. By eliminating the most computationally intensive step, the speed and effectiveness of the solution are improved.

The method, computer software product and system of the present disclosure are applied to describe methods and systems for cyclic employee scheduling, cyclic transportation system scheduling, cyclic scheduling of data packet transmission, especially as it applies to networks having a plurality of nodes, and cyclic production scheduling.

SUMMARY

Aspects of the present disclosure describe a cyclic combinatorial method, computer software product and system including a cost function minimization program method embodied in a computing machine in order to provide the capability to solve cyclic cost function minimization problems. The cost function minimization program can be used to solve problems having cyclic 0-1 matrices, such as cyclic workforce scheduling, cyclic transportation system scheduling, cyclic scheduling of data packet transmission, especially as it applies to networks having a plurality of nodes and cyclic production scheduling in a machine environment. Cyclically distinct solutions are identified by enumerating cyclically distinct combinations of basic dual variables to minimize a cost function of the scheduling problem.

In another aspect of the invention, dual solutions to the problems are found by applying a set of rules to the cyclically distinct solutions in order to provide a set of dominant solutions.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 3 is an exemplary illustration of dual solutions of the (5,7) problem for each value of m, according to certain embodiments.

FIG. 5 is a representative binary 7×7 matrix for the (5,7) scheduling problem, according to certain embodiments.

DETAILED DESCRIPTION

Figure 1:
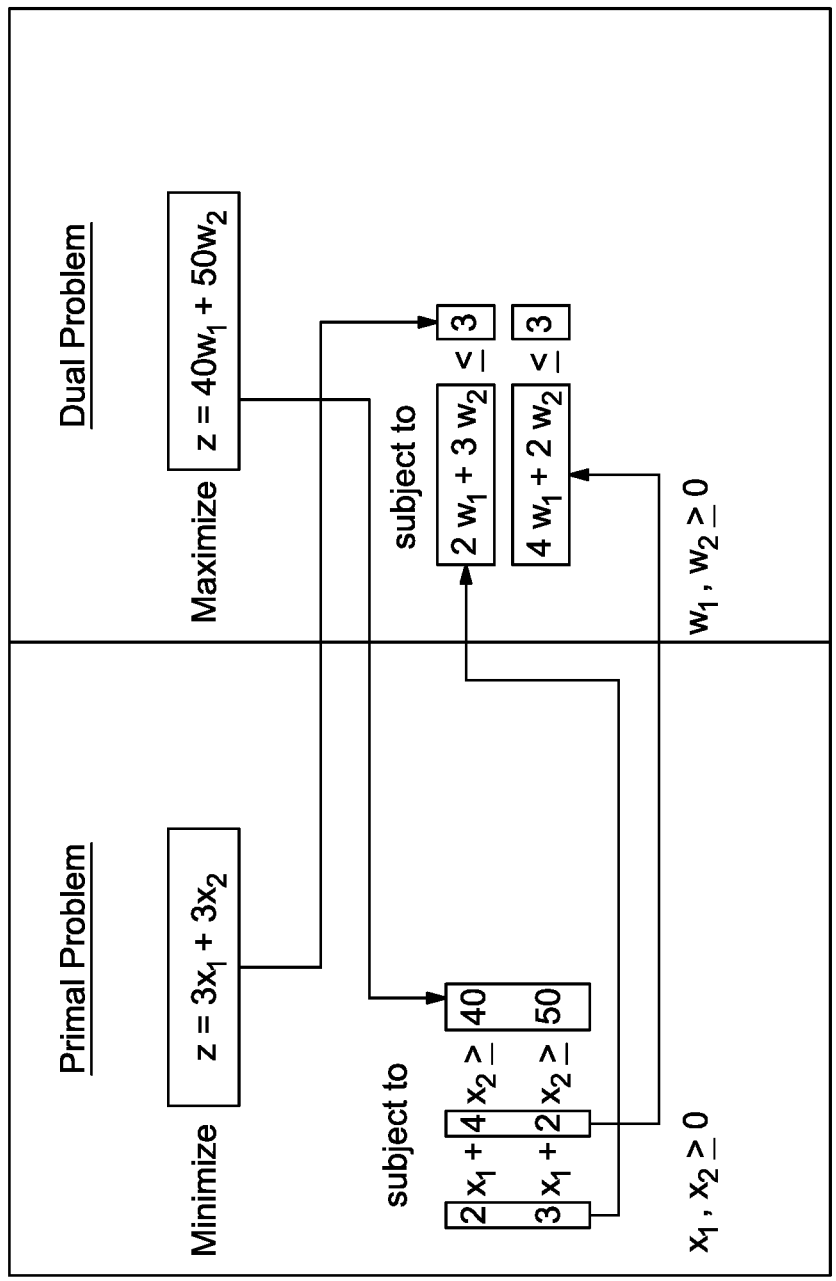
FIG. 1 is an overview of the transformation between the primal problem and the dual problem, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a cyclic combinatorial integer linear programming cost function minimization method, computer software product and system for solving integer programming models in cyclic scheduling problems. Methods for cyclic scheduling of workforce, data packets, robotic tasks, transportation systems, manufacturing, etc. are developed by applying the cost function minimization to the problem.

The cyclic scheduling problem may be one of a cyclic workforce scheduling problem, a cyclic transportation scheduling problem, a cyclic production scheduling problem, a cyclic scheduling of data packet transmission problem, especially as it applies to networks having a plurality of nodes and cyclic production scheduling in a machine environment, or any cyclic scheduling problem characterized by a variable which may be ON or OFF during a cycle.

A cyclic matrix is an nth-order matrix A, with elements $a(j, k)=a(k-j)$ that depend on only $k-j$, and that are periodic so that $a(k+n)=a(k)$. Equivalence among several necessary conditions is required for a square complex matrix to be cyclic. The cyclic property of the constraint matrix can be exploited in order to develop efficient solutions of cyclic problems. For example, the cyclic property of the constraint matrix can be utilized to devise models and efficient solution procedures for many types of cyclic cost function minimization problems.

A 0-1 vector is said to be circular if its ones occur consecutively, where the first and last entries are considered to be consecutive. A matrix is called column (row) circular if its columns (rows) are circular.

The methods of the present disclosure are designed to solve integer linear programming (ILP) cost function minimization problems with general integer variables and cyclic, binary (elements=0 or 1) constraint coefficient matrices. Methods of the present disclosure are designed to increase utilization of transportation systems, improve data transmission speeds, reduce data traffic at network nodes, schedule machine operating times versus down times, and others. These problems are very common in cyclic scheduling applications, and in cyclic employee scheduling in particular. The ILP model of the given problem to be solved has the following form:

$$\text{Minimize } Z = \sum_{j=1}^{n} c_j x_j \qquad (1)$$

Subject to $$\sum_{j=1}^{n} a_{ij} x_j \geq r_i, \ i=1, \ldots, n \qquad (2)$$

$$x_j \geq 0 \text{ and integer}, j=1, \ldots, n \qquad (3)$$

$$A = \{a_{ij}\} \text{ is a cyclic 0-1 } n \times n \text{ matrix} \qquad (4)$$

where $c_j$ represents the differential costs or weights for each $x_j$.

Workforce days-off scheduling problems are practical and well-studied cyclic labor scheduling problems, which apply to organizations that operate seven days a week. Usually, the notation (u, v) is used to denote the problem of assigning u consecutive work days out of a cycle of v days. In order to illustrate the cyclic combinatorial method, three days-off scheduling examples are used, including the (3,7), the (4,7), and the (5,7) problems, corresponding to three, four, and five consecutive workdays per week, respectively. Allowing only consecutive stretches of off-days in the weekly schedule, there are seven days-off patterns per week for each problem. Given varying labor demands for each day of the week, the objective is to determine how many employees to assign to each days-off pattern in order to satisfy labor demands with the minimum workforce size. Mathematically, the weekly days-off scheduling problem is represented by the ILP model of equations (1)-(4). In this non-limiting example of cyclic employee scheduling (Example 1), where the employees have a seven day work week and consecutive days off, the terms of equations (1)-(4) may represent:

$Z$=workforce size, i.e., the total number of workers assigned;

$a_{ij}$=1 if day i is a workday for days-off pattern j, otherwise $a_{ij}$=0;

$r_i$=number of workers required on day i, for I=1, 2, ..., 7; and $x_j$=number of workers assigned to work pattern j, for j=1, ..., 7

=number of employees off on days: mod 7 (j, j+1)

$A=\{a_{ij}\}$ is a cyclic 0-1 7×7 matrix as shown in FIG. 5.

"Mod 7" refers to a seven day work week, where the eighth day is day 1, the ninth day is day 2, etc.

In this example, $c_j$ may represent the salary or availability for each worker $x_j$. The solution to the problem, $W_{min}$, is the minimum number of employees needed to ensure that the required number of employees are on duty each day, while minimizing the total cost of employee salaries.

In a non-limiting example of cyclic transportation scheduling (Example 2), where vehicles travel on a route on ON (binary 1) days/hours and are sent to maintenance on OFF (binary 0) days/hours, equations (1)-(4) may represent:

$Z$=number of vehicles, (trains, buses, cars, trucks, ships, aircraft, spacecraft), i.e., the total number of vehicles assigned on a route;

$a_{ij}$=1 if day i is a travel day/hour for days-off/time-off pattern j, otherwise $a_{ij}$=0;

$r_i$=number of vehicles required on day i, i=1, 2, ..., 7; and $x_j$=number of vehicles assigned to maintenance days j.

$A=\{a_i\}$ is a cyclic 0-1 7×7 matrix shown in FIG. 5 for daily scheduling or is a cyclic 24×24 matrix for hourly time scheduling.

In this example, $c_j$ may represent the operating cost for each vehicle $x_j$. The solution to the problem, $W_{min}$, minimizes the total operating cost of the vehicles while ensuring that the required number of vehicles run on the route each day/hour.

In a non-limiting example, the ILP model may be applied to cyclic scheduling of a simplified bus timetabling problem in public transportation networks having a plurality of buses.

In this instance, for each bus station, equations (1)-(4) may represent:

$Z$=total number of buses used in the given bus station in each day (a cycle of 48 half-hour periods, assuming departures every 30 minutes);

$a_{ij}$=1 if time i is a trip departure time from this station for bus on route j, otherwise $a_{ij}$=0;

$r_i$=the demand (number of buses required by passengers) at time i, i=1, 2, ..., 48.

$x_j$=number of buses assigned to route j, j=1, 2, ..., 48.

$A=\{a_{ij}\}$ is a cyclic 0-1 48×48 matrix.

In this example, $c_j$ may represent the daily operating cost for each bus $x_j$. The solution to the problem $W_{min}$ minimizes the total cost of buses per day while ensuring that passenger demand for buses is satisfied during each time period within the daily cycle.

In another non-limiting example (Example 3), the ILP model may be applied to a cyclic scheduling of data packets transmitting problem, especially as it applies to networks having a plurality of nodes. In this example, each node transmits packets during a transmission time window of 60 seconds. The transmit time is one second with a buffer time of nine seconds, therefore, the transmit window is ten seconds. Therefore, the matrix A is a 6×6 matrix, where each i represents 10 seconds. In this instance, equations (1)-(4) may represent:

$Z$=total number of packets;

$a_{ij}$=1 if time i is an open transmission window time j, otherwise $a_{ij}$=0;

$r_i$=number of nodes required to transmit during time i, for i=1, 2, ..., 6;

$x_j$=number of nodes assigned to sleep pattern j, for j=1, ..., 6;

$A=\{a_{ij}\}$ is a cyclic 0-1 6×6 matrix.

In this situation, $W_{min}$ represents the minimum number of nodes which must be active to transmit all of the packets during a one minute time period.

In a further non-limiting example (Example 4), the ILP model may be applied to cyclic production scheduling, where machines are operated during ON (binary 1) hours and are not-operated during OFF (binary 0) hours in a 24 hour workday. In this instance, equations (1)-(4) may represent:

$Z$=machine resources, i.e., the total number of machines assigned;

$a_{ij}$=1 if hour i is an operating hour for hours-off pattern j, otherwise $a_{ij}$=0;

$r_i$=number of machines required on hour i, 1=1, 2, ..., 24; and $x_j$=number of machines assigned to hourly off pattern j.

$A=\{a_{ij}\}$ is a cyclic 0-1 24×24 matrix (not shown).

In this example, $c_j$ may represent the energy requirements for each machine $x_j$. The solution to the problem minimizes the total cost of energy expended while ensuring that the required number of machines operate each hour.

The dual model of a Linear Programming problem consists of an alternative modeling instance that allows one to recover the information of the original problem commonly known as primal model. Therefore it is sufficient to solve one of them (primal or dual) to obtain the best solution and the best value of the equivalent problem (primal or dual as applicable). A review of dual linear programming regarding primal-dual relationships for a two equation (2×2 matrix) follows.

Minimize $z=3x_1+3x_2$ (Primal problem)

subject to:

$2x_1+4x_2 \geq 40$ $3x_1+2x_2 \geq 50$ $x_1, x_2 \geq 0$

Solution: Maximize $z=40w_1+50w_2$ (Dual problem)

subject to:

$2w_1+3w_2 \leq 3$ $4w_1+2w_2 \leq 3$ $w_1, w_2 \geq 0$

The transformation from the primal problem to the dual problem is shown in FIG. 1.

The primal to dual relationship can be summarized as follows:

(i) The number of constraints in the primal problem is equal to the number of dual variables and vice versa.

(ii) If the primal problem is a maximization problem, then the dual problem is a minimization problem.

(iii) If the primal problem has "greater than" or "equal to" constraints, then the dual problem has "less than" or "equal to" constraints and vice versa.

(iv) The profit coefficients (c) of the primal problem appear on the right-hand side of the dual problem.

(v) The rows in the primal problem become the columns in the dual problem.

(See "Dual Formulation: Linear programming, Primal Dual Relationship". Universal Teacher Publications. http://www.universalteacherpublications.com/univ/ebooks/or/ch4/pdex.htm, incorporated herein by reference in its entirety).

Figure 2:
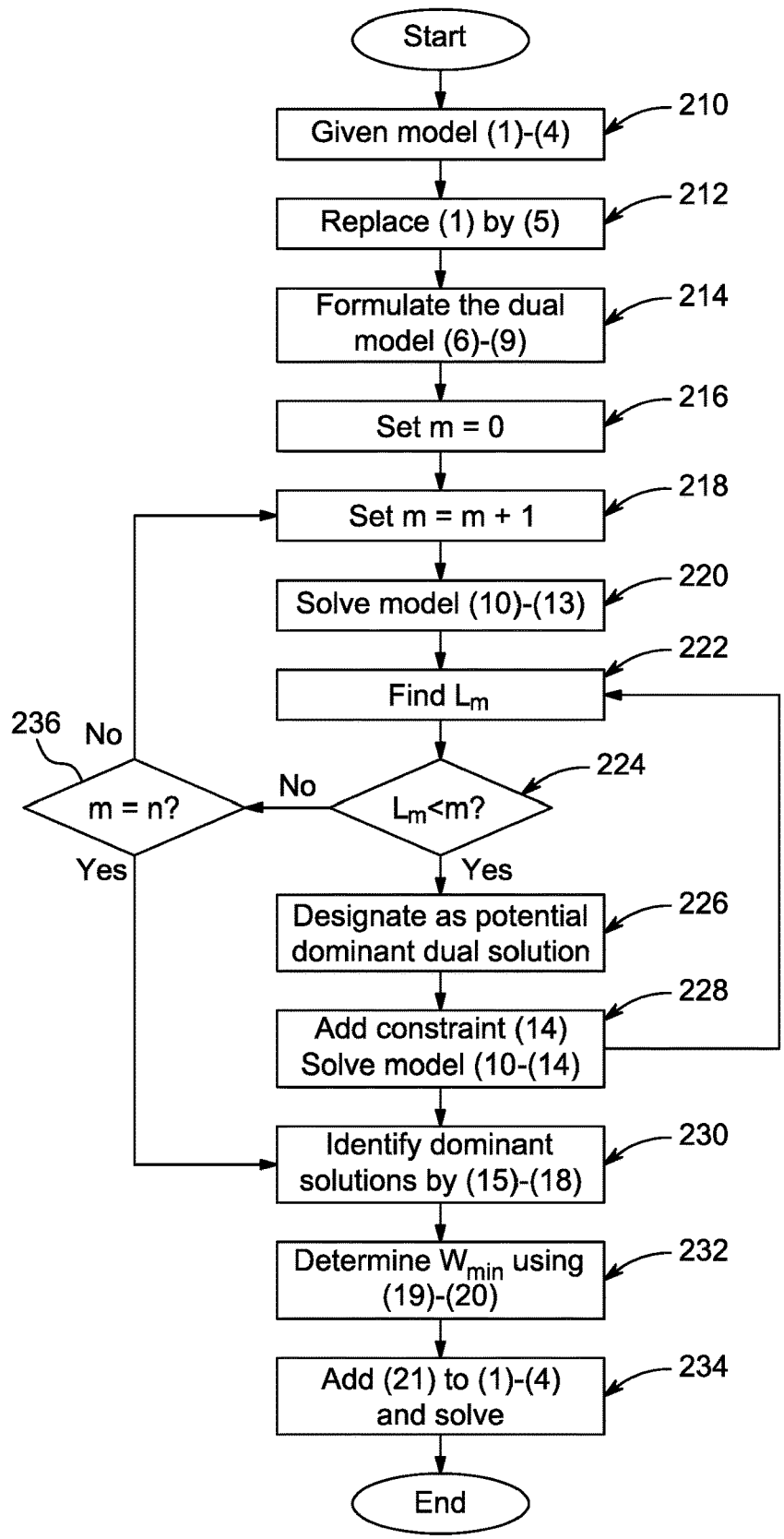
FIG. 2 is a flowchart of the cyclic scheduling method, according to certain embodiments.

Returning to the problem specified by equations (1)-(4), the solution consists of five steps. The steps of the process are described below, and a flowchart is shown in FIG. 2.

1) State the Model (step 210).

Convert the objective to minimize the total number of $x_j$ (e.g., number of workers in Example 1), instead of the total cost Z (e.g., the total number of workers assigned in Example 1). Ignoring the differential costs $c_j$ (in Example 1, assume all workers are at the same salary level or have the same availability) and assuming a uniform (unit) cost for each $x_j$, replace (step 212) the cost objective (1) by:

$$\text{Minimize } W_s = \Sigma_{j=1}^n x_j \quad (5)$$

where $W_s$ is the cost function with the differential costs $c_j=1$.

Using the above objective, and ignoring integrality restrictions, construct (step 214) the dual linear programming (LP) model as follows:

$$\text{Maximize } W_d = \Sigma_{j=1}^n r_j y_j \quad (6)$$

Subject to $$\Sigma_{j=1}^n a_{ij}^T y_j \leq 1, i=1,\ldots,n \quad (7)$$

$$y_j \geq 0, j=1,\ldots,n \quad (8)$$

$$A^T = \{a_{ij}^T\} \text{ is a cyclic 0-1 } n \times n \text{ matrix} \quad (9)$$

where $W_d$ represents the cost function of the dual linear problem.

2a) Set m=0 (step 216).

At (218), set m=m+1.

Identify potential dominant solutions by identifying the best sets of m basic (non-zero) dual variables out of the total n dual variables (m≤n) by solving (step 220) the equations (10)-13) below. At (step 222), find $L_m$, where $L_m$=the maximum number of non-zero coefficients in columns selected from L≤m.

For each value of m, where m=1, ..., n, solve the following ILP model:

$$\text{Minimize } L_m \quad (10)$$

Subject to $$\Sigma_{j=1}^n a_{ij}^T V_j \leq L_m \; i=1,\ldots,n \quad (11)$$

$$\Sigma_{j=1}^n V_j = m \quad (12)$$

$$V_j = 0 \text{ or } 1, j=1,\ldots,n \quad (13)$$

The best solution of the above binary integer program will specify a set of m selected variables $SV_m$ (set of variables $V_j$ whose value is equal to 1), in addition to the minimum value of $L_m$ (step 222). When $L_m < m$ (step 224) it is possible to assign a value of $1/L_m$ to m ($>L_m$) dual variables, indicating potential dominant solutions (step 226).

For the non-limiting example 1 regarding cyclic workforce scheduling, with dual variables $y_1, y_2, \ldots, y_7$, the dual model is given by:

$$\text{Maximize } W_d = \Sigma_{j=1}^n r_j y_j$$

Subject to:

$$\Sigma_{j=1}^n a_{ij}^T y_j \leq 1, i=1,\ldots,7$$

$$y_j \geq 0, j=1,\ldots,7$$

2b) The next step is used to identify alternative minimized cost function solutions for each value of m.

If $L_m = m$,

If m<n, set m=m+1 (218), and then go to (step 220).

If m=n (step 236), go to (step 218).

If $L_m < m$, find a potential dominant dual solution as shown in step (226), then add the following constraint (step 228) to the model specified by (10)-(13):

$$\Sigma_{j \in SV_m} V_j \leq L_m - 1 \quad (14)$$

In (14), $SV_m$ is circular, i.e. mod n, thus we need n of these constraints.

Solve (step 228) the model specified by (10)-(14), and then go (step 222).

3) Of the dual solutions found in Equations 10-14 (steps 222-228 of FIG. 2), the best ones are generally identified as having the highest ratio of $m/L_m$. Specifically, two sets of rules are used to identify the dominant solutions (step 230).

For dominant dual solutions, F, G and H:

I. Solution F is considered to dominate solution G if:

$$SV_G \subset SV_F \text{ (implying } F > G) \quad (15)$$

And $$L_F = L_G \quad (16)$$

II. Solutions F and G are considered to dominate solution H if:

$$SV_H = SV_F + SV_G \text{ (implying } H = F + G) \quad (17)$$

And $$L_H L_F + L_G \quad (18)$$

(See Alfares, H. K. (2012). "A dual-based combinatorial algorithm for solving cyclic optimization problems". Recent Patents on Computer Science, 5(3), 188-196, incorporated herein by reference in its entirety).

4) The set of dominant dual solutions consists of all non-dominant dual solutions. Considering integrality constraints, each dominant dual solution is rounded up to nearest integer values in order to obtain a lower bound for the value of W. For each value of m for which a dominant dual solution is obtained, the bound on W is specified by (step 232):

$$W_m \geq \lceil \Sigma_{j \in SV_m} r_j y_j / L_m \rceil \quad (19)$$

The set $SV_m$ is a cyclic set, thus all the values of j that belong to this set can be cyclically rotated, i.e. $SV_m = \mod n\{j \in SV_m, j=1, \ldots, n\}$. The maximum value of the above lower bounds provides a general expression for $W_{min}$, the minimum value of W.

$$W_{min} = \max(W_m) \quad (20)$$

To efficiently obtain an integer solution for the primal (original) problem (step 234), add the following constraint (equation 21) to the equations (1)-(4). The addition of this constraint greatly improves computational performance. (See Alfares, H. K. (1998). "An efficient two-phase algorithm for cyclic days-off scheduling". Computers & Operations Research, 25(11), 913-923, incorporated herein by reference in its entirety).

$$\Sigma_{j=1}^n x_j \geq W_{min} \quad (21)$$

5) In addition to imposing bounds such as (21), applying primal-dual complementary slackness relations to dominant dual solutions can lead to deriving partial or complete solutions to the original (primal) problem. (See Alfares, H. K. (2001), "Efficient optimization of cyclic labor days-off scheduling", OR Spektrum, 23(2), 283-294, incorporated herein by reference in its entirety).

For Example 1, solutions for maximized $W_d$ solve the example workplace scheduling problem which minimizes Ws. The solution set is a matrix which represents a schedule of employees ON and OFF days and indicates the most optimal solutions.

Figure 6:
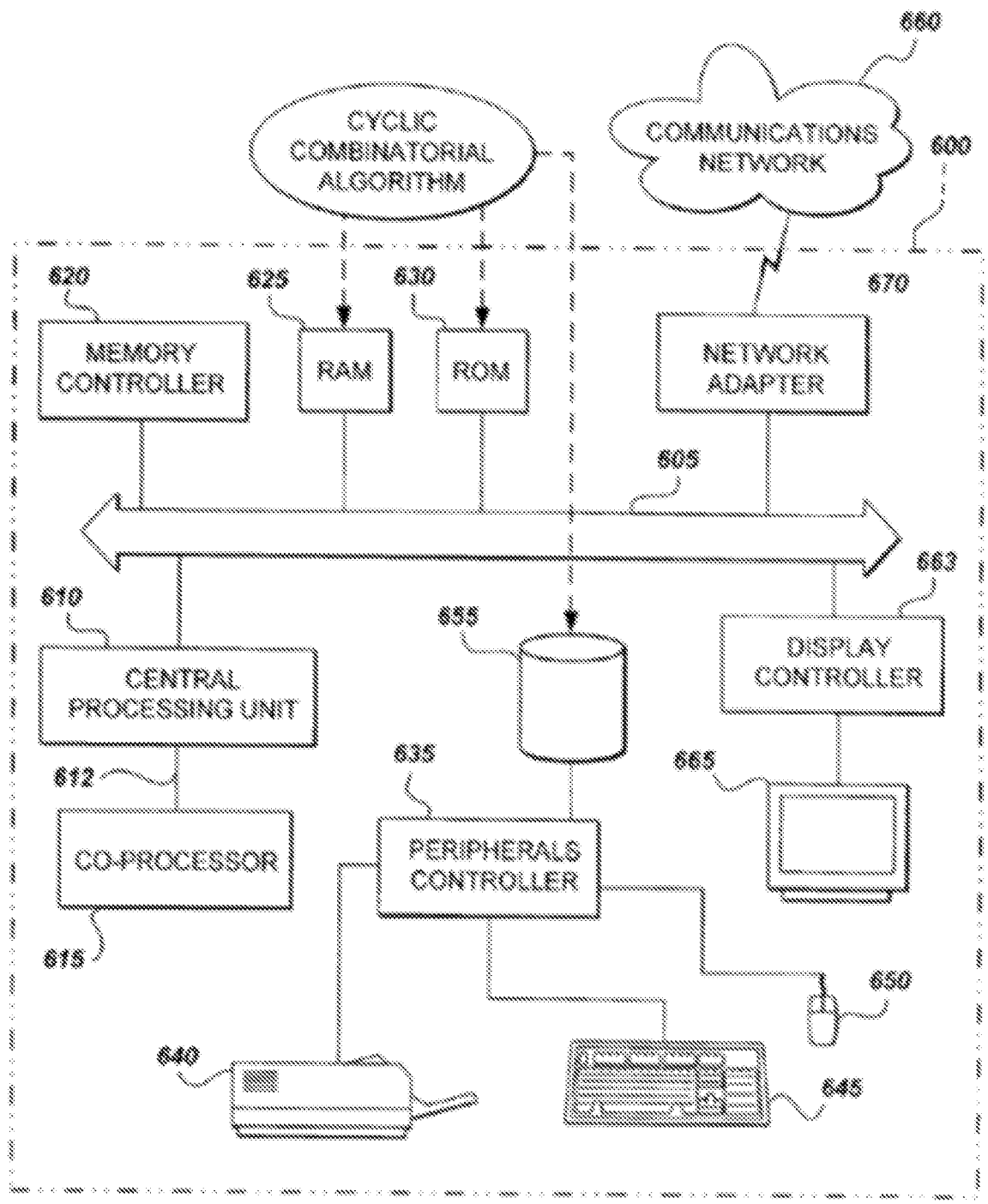
FIG. 6 is a block diagram of an exemplary system for carrying out the cyclic combinatorial method, according to certain embodiments.

The first embodiment is shown by FIGS. 2, 3 and 6 and describes a cyclic combinatorial integer linear programming cost function minimization method for finding a best solution for integer programming models in cyclic scheduling problems. In a non-limiting example, the cyclic scheduling problem may be one of a cyclic workforce scheduling problem, a cyclic transportation scheduling problem, a cyclic scheduling of data packet transmitting and receiving problem, especially as it applies to networks having a plurality of nodes and a cyclic production scheduling problem in a machine environment, or any cyclic scheduling problem characterized by a variable which may be ON or OFF during a cycle.

The method is applied to the problem (step 210) by identifying a linear objective function and its linear constraints, wherein the linear objective function has the form: $Z = \Sigma_{j=1}^n c_j x_j$; where each $c_j$ represents a differential cost for $x_j$; wherein the linear constraints are of the form: $\Sigma_{j=1}^n a_{ij} x_j \geq r_i$, i=1, \ldots, n, in which $x_j \geq 0$ and integer, for j=1, \ldots, n, where the set $\{a_{ij}\}$ is a cyclic 0-1 n×n matrix (A).

The method proceeds by codifying the objective function and the linear constraints as a plurality of matrices and storing the plurality of matrices in computer readable memory (655); enumerating cyclically distinct combinations of basic dual variables related to any of the matrices having cyclic 0-1 properties so as to identify cyclically distinct solutions by: minimizing a cost function, $W_s$, of the scheduling problem (step 212), wherein the cost function $W_s$ of the scheduling problem is expressed as: $W_s = \Sigma_{j=1}^n x_j$, where $x_j \geq 0$ and integer, for j=1, \ldots, n; constructing a dual linear problem of the cost function $W_s$ and maximizing the cost function $W_d$ of the dual linear problem (step 212), wherein the cost function $W_d$ of the dual linear problem is expressed as $W_d = \Sigma_{j=1}^n r_j y_j$, subject to constraints $\Sigma_{j=1}^n a_{ij}^T y_j \leq 1$, for i=1, \ldots, n, and $y_j \geq 0$, for j=1, \ldots, n where $y_j \geq 0$, $A^T = \{a_{ij}^T\}$ is a cyclic 0-1 n×n matrix and each $r_j$ represents a known requirement of the scheduling problem.

The method continues by identifying potential dominant solutions by minimizing $L_m$ subject to $\Sigma_{j=1}^n a_{ij}^T V_j \leq L_m$, for i=1, \ldots, n; $\Sigma_{j=1}^n V_j = m$; and $V_j = 0$ or 1, for j=1, \ldots, n; (steps 213-226) and by identifying the best sets of m basic non-zero dual variables ($SV_m$) of the total n dual variables where m≤n, wherein identifying the best sets of m basic non-zero dual variables ($SV_m$) comprises adding the constraint $\Sigma_{j \in SV_m} V_j \leq L_m - 1$ to the sets of m basic non-zero dual variables ($SV_m$) of the total n dual variables and determining the ratios $m/L_m$ for each set. The best sets (shown as underlined in FIG. 3) are those with the highest ratio of $m/L_m$. The method further comprises minimizing (step 228) the maximum number of non-zero coefficients ($L_m$) in each potential dominant solution.

The method continues by applying a set of rules (step 230) to the cyclically distinct solutions in order to provide a set of dominant solutions which determine (steps 232, 234) the minimum value of the cost function of the scheduling problem, wherein applying a set of rules to the cyclically distinct solutions in order to provide a set of dominant solutions comprises comparing the sets $SV_m$ of dominant solutions in which if the a first dominant solution set $SV_{1st}$ is a subset of a second dominant solution set $SV_{2nd}$ and $L_{1st}$ of the first solution equals $L_{2nd}$ of the second solution, the second solution dominates the first solution; or if a sum of a first dominant solution set $SV_{1st}$ and a second dominant solution set $SV_{2nd}$ equals a third solution $L_{3rd}$ and $L_{3rd}$ of the third solution equals the sum of $L_{1st}$ and $L_{2nd}$, the first and second solutions dominate the third solution.

The method concludes by displaying (663, 665) the set of dominant solutions of the scheduling problem to a user.

The process of Example 1 is illustrated numerically for the cyclic (5,7) workforce scheduling problem. The daily labor demands during the week ($r_1, \ldots, r_7$) are given as (20, 14, 10, 19, 17, 7, 12) employees per day. Following the process shown in FIG. 3, the dominant dual solutions are marked in bold in Table 1 below.

TABLE 1

Dominant dual solutions of the cyclic employee scheduling problem of Example 1.

| m | SV[1] | $L_m$ | $m/L_m$[2] | $W_m$ |
|---|---|---|---|---|
| 1 | Column 1 | 1 | 1 | 20/1 = 20 |
| 2 | Columns 1, 4 | 2 | 1 | (20 + 19)/2 = 19.5 |
| 3 | Columns 1, 4, 5 | 3 | 1 | (20 + 19 + 17)/3 = 18.67 |
| 4 | Columns 2, 4, 5, 7 | 3 | 4/3 | (14 + 19 + 17 + 12)/3 = 20.67 |
| 5 | Columns 1, 3, 4, 5, 6 | 4 | 5/4 | (20 + 10 + 19 + 17 + 7)/4 = 18.25 |
| 5 | Columns 1, 2, 4, 5, 7 | 4 | 5/4 | (20 + 14 + 19 + 17 + 12)/4 = 20.5 |
| 6 | Columns 1, 2, 3, 4, 5, 7 | 5 | 6/5 | (20 + 14 + 10 + 19 + 17 + 12)/5 = 18.4 |
| 7 | All 7 columns | 5 | 7/5 | (20 + 14 + 10 + 19 + 17 + 7 + 12)/5 = 19.8 |

TABLE 2

Number of employees required each day in Example 1.

| i | 1 | 2 | 3 | 4 | 5 | 6 | 7 | Sum |
|---|---|---|---|---|---|---|---|---|
| $r_i$ | 20 | 14 | 10 | 19 | 17 | 7 | 12 | 99 |

Using equations (19) and (20) by rounding up the maximum $W_m$ value above, the minimum workforce size is given by $W_{min}=21$.

The first embodiment further includes expressing the cost function $W_s$ of the scheduling problem as: $W_s=\Sigma_{j=1}^n x_j$, where $x_j \geq 0$ and integer, for $j=1, \ldots, n$ and expressing the cost function $W_d$ of the dual linear problem as $W_d=\Sigma_{j=1}^n r_j y_j$, subject to constraints $\Sigma_{j=1}^n a_{ij}^T y_j \leq 1$, for $i=1, \ldots, n$, and $y_j \geq 0$, for $j=1, \ldots, n$ where $y_j \geq 0$, $A^T=\{a_{ij}^T\}$ is a cyclic 0-1 n×n matrix and each $r_j$ represents a known requirement of the scheduling problem.

The method of the first embodiment further comprises determining the minimum value of the cost function of the scheduling problem. For each dual dominant solution obtained, the method proceeds by rounding the solution to the nearest integer value to obtain a lower bound for the value of $W_d$, such that, for each value m for which a dominant dual solution is obtained, the bound on $W_d$ is specified by $W_m \geq [\Sigma_{j \in SV_m} r_j y_j / L_m]$ and the maximum value of each lower bound provides the minimum value of $W_d$, $W_{min}=\max(W_m)$, where $\Sigma_{j=1}^n x_j \geq W_{min}$.

The method of the first embodiment may be applied to a cyclic employee scheduling problem defined by a seven day work week with consecutive days off; where Z=workforce size, $a_{ij}=1$ if day i is a workday for days-off pattern j, otherwise $a_{ij}=0$, $r_i$=number of workers required on day i, for $1=1, 2, \ldots, 7$, $c_j$=the cost of the worker, $x_j$=number of workers assigned to work pattern j, for $j=1, \ldots, 7$ and $x_j$=the number of employees off on days: mod 7 (j, j+1), and $A=\{a_{ij}\}$ is a cyclic 0-1 7×7 matrix.

The method of the first embodiment may be applied to a cyclic transportation scheduling problem is defined by vehicle scheduling, where the vehicle is at least one of a train, bus, car, truck, ships, aircraft and spacecraft; where Z=the total number of vehicles; $a_{ij}=1$ if i is a travel time, otherwise $a_{ij}=0$, $r_i$=number of vehicles required during travel time i, and $x_j$=number of vehicles assigned to OFF times j.

The method of the first embodiment may be applied more specifically in a non-limiting example to a cyclic bus scheduling for a transportation system, having a plurality of buses. In this example, Z=total number of buses used in the given bus station in each day (a cycle of 48 half-hour periods, assuming departures every 30 minutes); $a_{ij}=1$ if time i is a trip departure time from this station for bus on route j, otherwise $a_{ij}=0$; $r_i$=the demand (number of buses required by passengers) at time i, $i=1, 2, \ldots, 48$, $x_j$=number of buses assigned to route j, $j=1, 2, \ldots, 48$, and $A=\{a_{ij}\}$ is a cyclic 0-1 48×48 matrix.

The method of the first embodiment may be applied to a cyclic scheduling of data packet transmission problem, especially as it applies to networks having a plurality of nodes.

In this example, each node is transmitting or sleeping during a time period defined by time increments i; where Z=the total number of data packets, $a_{ij}=1$ if time i is an open transmission time window j, otherwise $a_{ij}=0$; $r_i$=number of nodes required to transmit during time i, for $i=1, 2, \ldots, n$; $x_j$=number of nodes assigned to sleep pattern j, for $j=1, \ldots, n$; $A=\{a_{ij}\}$ is a cyclic 0-1 n×n matrix; and wherein the solution, $W_{min}$, represents the minimum number of nodes which must be active to transmit all of the packets during the time period.

The method of the first embodiment may be applied to a cyclic production scheduling problem defined by machine scheduling for ON hours and OFF hours during a 24 hour workday; where Z=the total number of machines assigned, $a_{ij}=1$ if hour i is an ON hour for hours-off pattern j, otherwise $a_{ij}=0$; $r_i$=number of machines required on hour i, $1=1, 2, \ldots, 24$, $x_j$=number of machines assigned to hourly off pattern j, and $A=\{a_{ij}\}$ is a cyclic 0-1 24×24 matrix.

FIG. 2, 3, 6 illustrate a second embodiment to a computer software product that includes a medium readable by a processor 610, the medium having stored thereon a set of instructions for performing a cyclic combinatorial integer linear programming cost function minimization method for solving integer programming models in scheduling problems (note Cyclic Combinatorial Algorithm, FIG. 6), the instructions comprising (a) a first set of instructions which, when loaded into main memory and executed by the processor, causes the processor to accept parameters related to a scheduling problem as inputs (step 210); (b) a second set of instructions which, when loaded into main memory and executed by the processor, causes the processor to identify a linear objective function and its linear constraints for cost function minimization (step 210); (c) a third set of instructions which, when loaded into main memory 655 and executed by the processor 610, causes the processor to codify the objective function and the linear constraints as a plurality of matrices; (d) a fourth set of instructions which, when loaded into main memory and executed by the processor, causes the processor to enumerate cyclically distinct combinations of basic dual variables related to any of the matrices having cyclic 0-1 properties so as to identify cyclically distinct solutions (step 214-234), wherein said enumeration includes using a procedure that minimizes a cost function $W_s$ of the scheduling problem (step 210), the procedure including the following steps: constructing a dual linear problem (step 212) of the cost function $W_s$ and maximizing the cost function $W_d$ of the dual linear problem (step 214); identifying potential dominant solutions by identifying the best sets of m basic non-zero dual variables ($SV_m$) of the total n dual variables where m≤n (step 220); minimizing the maximum number of non-zero coefficients ($L_m$) in each potential dominant solution (step 220); (e) a fifth set of instructions which, when loaded into main memory and executed by the processor, causes the processor to apply a set of rules (steps 228-230) to the cyclically distinct solutions in order to provide a set of dominant solutions which determine the minimum value $W_{min}$ of the cost function $W_s$ of the scheduling problem (step 234); and (f) a sixth set of instructions which, when loaded into main memory and executed by the processor, causes the processor to display (663, 665) the set of dominant solutions on a display device of the machine.

The second embodiment includes wherein the identifying and codifying steps of the second and third sets of instructions further comprise: (g) a seventh set of instructions which, when loaded into main memory and executed by the processor, causes the processor to express an ILP problem in the form of minimizing $Z=\Sigma_{j=1}^n c_j x_j$. where each $c_j$ represents a differential cost for $x_j$; is a cyclic 0-1 matrix, subject to $\Sigma_{j=1}^n a_{ij} x_j \geq r_i$, $i=1, \ldots, n$, where $x_j \geq 0$ and integer, for $j=1, \ldots, n$, where the set $\{a_{ij}\}$ is a cyclic 0-1 n×n matrix (A); (h) an eighth set of instructions which, when loaded into main memory and executed by the processor, causes the processor to construct a dual LP model in the form of maximizing $W_d=\Sigma_{j=1}^n r_j y_j$, subject to constraints $\Sigma_{j=1}^n a_{ij}^T y_j \leq 1$, for $i=1, \ldots, n$, and $y_j \geq 0$, for $j=1, \ldots, n$ where $y_j \geq 0$, $A^T=\{a_{ij}^T\}$ is a cyclic 0-1 n×n matrix and each $r_j$ represents a known requirement of the scheduling problem.

The second embodiment further includes (i) a ninth set of instructions which, when loaded into main memory and executed by the processor, causes the processor to minimize $L_m$ subject to $\Sigma_{j=1}^n a_{ij}^T V_j \leq L_m$, for $i=1, \ldots, n$; $\Sigma_{j=1}^n V_j = m$; and $V_j=0$ or 1, for $j=1, \ldots, n$; (j) a tenth set of instructions which, when loaded into main memory and executed by the processor, causes the processor to identify the best sets of m basic non-zero dual variables ($SV_m$) by adding the constraint $\Sigma_{j \in SV_m} V_j \leq L_m-1$ to the sets of m basic non-zero dual variables ($SV_m$) of the total n dual variables and determine the ratios $m/L_m$ for each set, compare the ratios and identify the best sets as those with the highest ratios of $m/L_m$; (k) an eleventh set of instructions which, when loaded into main memory and executed by the processor, causes the processor to store each set $SV_m$; (l) a twelfth set of instructions which, when loaded into main memory and executed by the processor, causes the processor to apply a set of rules to the cyclically distinct solutions in order to provide a set of dominant solutions by comparing the sets $SV_m$ of dominant solutions, wherein if the a first dominant solution set $SV_{1st}$ is a subset of a second dominant solution set $SV_{2nd}$ and $L_{1st}$ of the first solution equals $L_{2nd}$ of the second solution, the second solution dominates the first solution; or wherein if a sum of a first dominant solution set $SV_{1st}$ and a second dominant solution set $SV_{2nd}$ equals a third solution $L_{3rd}$ and $L_{3rd}$ of the third solution equals the sum of $L_{1st}$ and $L_{2nd}$, the first and second solutions dominate the third solution.

Finally, the method finds the solution to minimizing the cost function (step 234) of the cyclic scheduling problem by (m) a thirteenth set of instructions which, when loaded into main memory and executed by the processor, causes the processor to determine the minimum value of the cost function of the scheduling problem by, for each dual dominant solution obtained, rounding the solution to the nearest integer value to obtain a lower bound for the value of $W_d$, such that, for each value m for which a dominant dual solution is obtained, the bound on $W_d$ is specified by $W_m \geq \lceil \Sigma_{j \in SV_m} r_j y_j / L_m \rceil$ and the maximum value of each lower bound provides the minimum value of $W_d$, $W_{min}=\max(W_m)$, where $\Sigma_{j=1}^{n} x_j \geq W_{min}$.

A third embodiment to a system for performing cyclic combinatorial integer linear programming cost function minimization for solving constraint models in scheduling problems is described with respect to FIG. 2, 3, 6.

The system comprises a processor 610; computer readable memory 655 coupled to the processor; a user interface 645 coupled to the processor; a display (663, 665) coupled to the processor; and software stored in the memory and executable by the processor, the software having: means for accepting parameters related to the problem as system inputs (step 210); means for identifying a linear objective function and its linear constraints for cost function minimization (step 210); means for codifying the objective function and the linear constraints as a plurality of matrices; means for enumerating cyclically distinct combinations of basic dual variables related to any of the matrices having cyclic 0-1 properties so as to identify cyclically distinct solutions, wherein said enumeration includes using a procedure that minimizes a cost function $W_s$ of the scheduling problem (step 210), the procedure including the following steps: constructing a dual linear problem of the cost function $W_s$ and maximizing the cost function $W_d$ of the dual linear problem (step 212, 214); identifying potential dominant solutions (steps 216-226) by identifying the best sets of m basic non-zero dual variables ($SV_m$) of the total n dual variables where $m \leq n$; minimizing the maximum number of non-zero coefficients ($L_m$) in each potential dominant solution (step 228); means for applying a set of rules to the cyclically distinct solutions in order to provide a set of dominant solutions to thereby solve the problem by determining the minimum value of the cost function Ws of the scheduling problem (steps 222-234); and means for displaying the set of dominant solutions to a user of the system.

The third embodiment further includes means for minimizing $Z=\Sigma_{j=1}^{n} c_j x_j$; where each $c_j$ represents a differential cost for $x_j$; is a cyclic 0-1 matrix, subject to $\Sigma_{j=1}^{n} a_{ij} x_j \geq r_i$, $i=1, \ldots, n$, where $x_j \geq 0$ and integer, for $j=1, \ldots, n$, where the set $\{a_{ij}\}$ is a cyclic 0-1 n×n matrix (A); and means for maximizing $W_d = \Sigma_{j=1}^{n} r_j y_j$, subject to constraints $\Sigma_{j=1}^{n} a_{ij}^T y_j \leq 1$, for $i=1, \ldots, n$, and $y_j \geq 0$, for $j=1, \ldots, n$ where $y_j \geq 0$, $A^T = \{a_{ij}^T\}$ is a cyclic 0-1 n×n matrix and each $r_j$ represents a known requirement of the scheduling problem.

In a further aspect of the third embodiment, the system includes means for minimizing $L_m$ subject to $\Sigma_{j=1}^{n} a_{ij}^T V_j \leq L_m$, for $i=1, \ldots, n$; $\Sigma_{j=1}^{n} V_j = m$; and $V_j = 0$ or 1, for $j=1, \ldots, n$; means for identifying the best sets of m basic non-zero dual variables ($SV_m$) by adding the constraint $\Sigma_{j \in SV_m} V_j \leq L_m-1$ to the sets of m basic non-zero dual variables ($SV_m$) of the total n dual variables and determining the ratios $m/L_m$ for each set, comparing the ratios and identifying the best sets as those with the highest ratios of $m/L_m$; means for storing each set $SV_m$; means for applying a set of rules to the cyclically distinct solutions in order to provide a set of dominant solutions by comparing the sets $SV_m$ of dominant solutions, wherein if the a first dominant solution set $SV_{1st}$ is a subset of a second dominant solution set $SV_{2nd}$ and $L_{1st}$ of the first solution equals $L_{2nd}$ of the second solution, the second solution dominates the first solution; or wherein if a sum of a first dominant solution set $SV_{1st}$ and a second dominant solution set $SV_{2nd}$ equals a third solution $L_{3rd}$ and $L_{3rd}$ of the third solution equals the sum of $L_{1st}$ and $L_{2nd}$, the first and second solutions dominate the third solution.

Finally the system provides means for determining the minimum value of the cost function of the scheduling problem by, for each dual dominant solution obtained, rounding the solution to the nearest integer value to obtain a lower bound for the value of $W_d$, such that, for each value m for which a dominant dual solution is obtained, the bound on $W_d$ is specified by $W_m \geq \lceil \Sigma_{j \in SV_m} r_j y_j / L_m \rceil$ and the maximum value of each lower bound provides the minimum value of $W_d$, $W_{min}=\max(W_n)$, where $\Sigma_{j=1}^{n} x_j \geq W_{min}$.

To illustrate the application of the algorithm to a cyclic scheduling method, an example is given of solving the (5, 7) days-off scheduling problem. The 0-1 matrix for this problem is shown in FIG. 5. In this problem, each employee is assigned to a days-off pattern of 5 consecutive work days and 2 consecutive off days within a 7-day work cycle. Since the off days can start any day within the cycle, 7 days-off patterns are possible. Therefore, the problem has 7 decision variables (patterns) and 7 constraints (daily staffing demands). The problem is applied to the integer programming model (1)-(4), where n=7, and the decision variables $x_j$ and constraint matrix A are defined below:

$x_j$=number of employees on work pattern j, $j=1, \ldots, 7$
=number of employees off on days: mod 7 (j, j+1)

Step 1: The objective is changed to (5), and the dual model (6)-(9) is formulated.

Step 2: For each value of m, where $m=1, \ldots, 7$, solve the ILP model specified by (10)-(13).

The results of applying step 2 are shown in FIG. 3.

Step 3: Applying dominance rules specified by (15)-(18), three dominant solutions are identified and underlined in FIG. 3.

Step 4: The three dominant solutions identified in Step 3 are used to develop the following expression for the minimum values of $W=\Sigma_{j=1}^{7} x_j$:

$$W = \max\left\{r_{max}, \left\lceil \frac{R_{max}}{3} \right\rceil, \left\lceil \frac{1}{5}\sum_{i=1}^{7} r_i \right\rceil\right\} \quad (22)$$

where $R_{max} = \max_{i=1,\ldots,7}\{R_i\}$ $R_i = r_i + r_{i+1(mod\,7)} + r_{i+3(mod\,7)} + r_{i+5(mod\,7)}$ (1) k=1, . . . ,7, all values are mod 7.
(2) Underlined cells indicate dominant solutions.

In the commonly owned patent, U.S. Pat. No. 8,046,316, Step 2 involves a cyclic selection step that combines partition and permutation. This step combines partition, cyclic permutation, and rules to eliminate cyclically redundant combinations. The number of iterations in this step is equal to the number cyclically distinct permutations of m partitions of an integer n (where 1≤m≤n).

Figure 4:
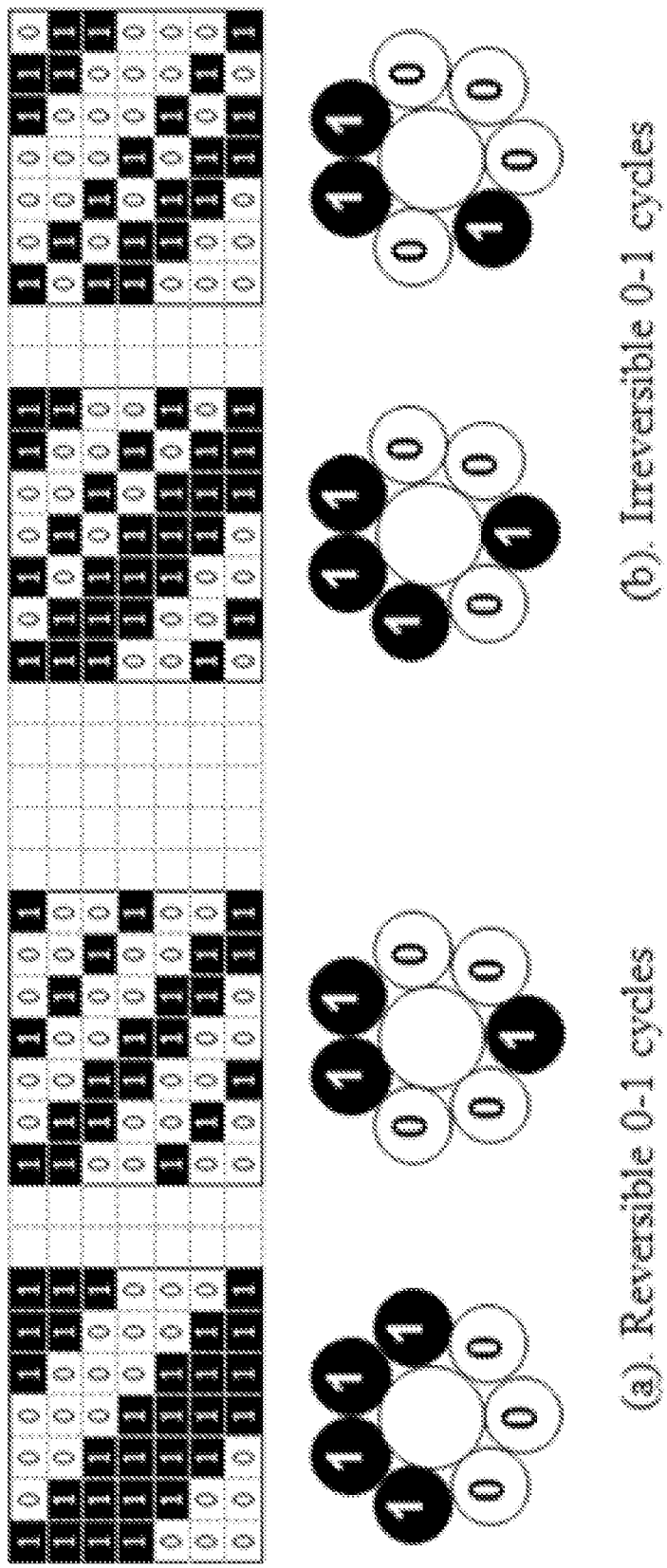
FIG. 4 illustrates reversible and reversible 0-1 cycles, according to certain embodiments.

The total number of iterations in the method of U.S. Pat. No. 8,046,316 depends on whether the cycle corresponding to 0-1 matrix is reversible or irreversible. A reversible 0-1 cycle is symmetric, while an irreversible is not. When a reversible 0-1 cycle is turned over, the same cycle is obtained. Reversible 0-1 cycles can be divided into two identical (mirror image) halves. Examples of reversible (symmetric) and irreversible (asymmetric) 0-1 matrices and corresponding cycles are shown on FIG. 4.

For a small representative sample of n values, the number of reversible and irreversible cycles (iterations) are shown in Table 3. Clearly, the number of cyclic iterations is very large even for small-size problems. This means that the number of iterations needed in U.S. Pat. No. 8,046,316 is quite large, and this number roughly doubles with each increment in the problem size n. In comparison, the number of iterations of the present disclosure is simply equal to n, since equations (10)-(13) need be solved only once for each value of m, where m=1, . . . , n.

Referring to FIG. 6, an exemplary computing system 600 for implementing cyclic combinatorial cost function minimization method of the present invention is described. Computing system 600 is capable of executing the cyclic combinatorial algorithm 400 as an application. Exemplary computing system 600 is controlled primarily by computer readable instructions, which may be in the form of software, firmware, a combination of software and firmware, or the like. Such software may be executed within central processing unit (CPU) 610 to cause system 600 to perform a useful task, such as execution of the cyclic combinatorial algorithm of the present invention. While computing system 600 may utilize a central processing unit 610 that is implemented by microelectronic chips in a general purpose, microprocessor configuration, system 600 may have a variety of computing machine architectures, such as programmable logic arrays (PLA), application specific integrated circuits (ASIC), field programmable gate arrays (FPGA), and the like. Moreover, computing environment 600 may use resources of remote CPUs through communications network 660 or other data communications means.

In the embodiment shown, a math co-processor 615 designed to perform numeric calculations more efficiently than general-purpose CPU 610 is provided to perform additional functions and/or assist CPU 610 in executing the cyclic combinatorial algorithm of the present invention. As shown in FIG. 6, CPU 610 can be connected to co-processor 615 through a bus 612.

In operation, CPU 610 fetches, decodes, and executes instructions, and transfers information to and from other resources via the computer's main data transfer path, system bus 605. The system bus 605 connects the components in computing system 600 and provides a data exchange medium. System bus 605 preferably includes data lines for data communication among/with attached devices, address

TABLE 3

Comparison of the number of iterations between U.S. Pat. No. 8,046,316 and the present disclosure for n cyclic objects

| Patent | n | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| US' 316 | Reversible | 1 | 2 | 3 | 4 | 6 | 8 | 13 | 18 | 30 | 46 | 78 | 126 | 224 | 380 | 687 | 1224 |
|  | Irreversible | 1 | 2 | 3 | 4 | 6 | 8 | 14 | 20 | 36 | 60 | 108 | 188 | 352 | 632 | 1182 | 2192 |
| New | Any cycle | 0 | 1 | 2 | 3 | 4 | 5 | 6 | 7 | 8 | 9 | 10 | 11 | 12 | 13 | 14 | 15 |

The present disclosure describes a cyclic cost function minimization procedure which efficiently solves problems with cyclic 0-1 coefficient matrices. This cost function minimization procedure has many practical applications in the cyclic scheduling of employees, transportation systems, cyclic scheduling of data packet transmission, especially as it applies to networks having a plurality of nodes and production/manufacturing operations. Explicitly, the cost function minimization procedure has the following features:

1. In the new procedure, the time-consuming cyclic selection step in the algorithm of U.S. Pat. No. 8,046,316 is eliminated. That step is replaced with a significantly more efficient procedure for identifying cyclically distinct dominant dual solutions.

2. The new procedure has a much higher computational efficiency than that of the existing U.S. Pat. No. 8,046,316 algorithm. While the number of iterations in Step 2 of U.S. Pat. No. 8,046,316 algorithm grows at a polynomial rate with problem size n, the number of iterations for the same step in the new algorithm is simply equal to n.

lines for addressing attached devices, and control lines for polling, interrupting, controlling attached devices on the system bus 605.

Memory devices coupled to system bus 605 may include random access memory (RAM) 625, read only memory (ROM) 630, or the like. Programmed instructions implementing the cyclic combinatorial algorithm of the present invention may be stored and retrieved RAM 625, ROM 630, or stored/retrieved to/from a combination of both storage devices.

ROMs 630 generally contain stored data that cannot be modified. Alternatively, some of the data generated or used by the present invention could be stored in a ROM that is programmable for storage/retrieval of infrequently changing data.

Data stored in RAM 625 can be read or changed by CPU 610 or other hardware devices. Access to RAM 625 and/or ROM 630 may be controlled by memory controller 620. Memory controller 620 may provide an address translation function that translates virtual addresses into physical addresses as instructions are executed. Memory controller 620 may also provide a memory protection function that isolates processes within the system and isolates system processes from user processes. Thus, a program running in a user mode can normally access only memory mapped by its own process virtual address space so that it cannot access memory within the virtual address space of another process, unless permission for memory sharing between the processes has been granted.

In addition, computing system 600 may contain peripheral controller 635 responsible for communicating instructions from CPU 610 to peripherals, such as, printer 640, keyboard 645, mouse 650, and data storage device 655. Tangible results of processing according to the present invention may be stored in the data storage drive 655 and/or may be printed out on the printer 640. Moreover, programmed instructions implementing the cyclic combinatorial algorithm may be stored, in whole or in part, within the data storage drive 655.

Display 665, which is controlled by display controller 663, is used to display visual output generated by computing system 600. Such visual output may include text, graphics, animated graphics, and video. Display 665 may be implemented with a CRT-based video display, an LCD-based flat panel display, a gas plasma-based flat panel display, a touch panel, or other display forms. Display controller 663 includes electronic components required to generate a video signal that is sent to display 665. It is within the contemplation of the present invention to provide tangible results of the cyclic combinatorial algorithm via any combination of text, graphics, animated graphics, and video that can be presented on display 665.

Additionally, computing system 600 may contain network adaptor 670 that can be used to connect computing system 600 to an external communication network 660, e.g., the Internet, an intranet, or the like. Communications network 660 may provide computer users with means of communicating and transferring software implementation and results of the cyclic combinatorial algorithm electronically. Moreover, communications network 660 may provide distributed processing, which can involve a plurality of computing elements sharing the workload and cooperatively performing the cyclic combinatorial algorithm. It will be appreciated that the network connections shown are exemplary, and other means of establishing a communications link between the computers may be used.

Exemplary computer system 600 is merely illustrative of a computing environment in which the inventive problem solving methods may operate and does not limit the implementation of the herein described cyclic combinatorial algorithmic method in computing environments having differing components and configurations, as the inventive concepts described herein may be implemented in various computing environments having various components and configurations.

Figure 7:
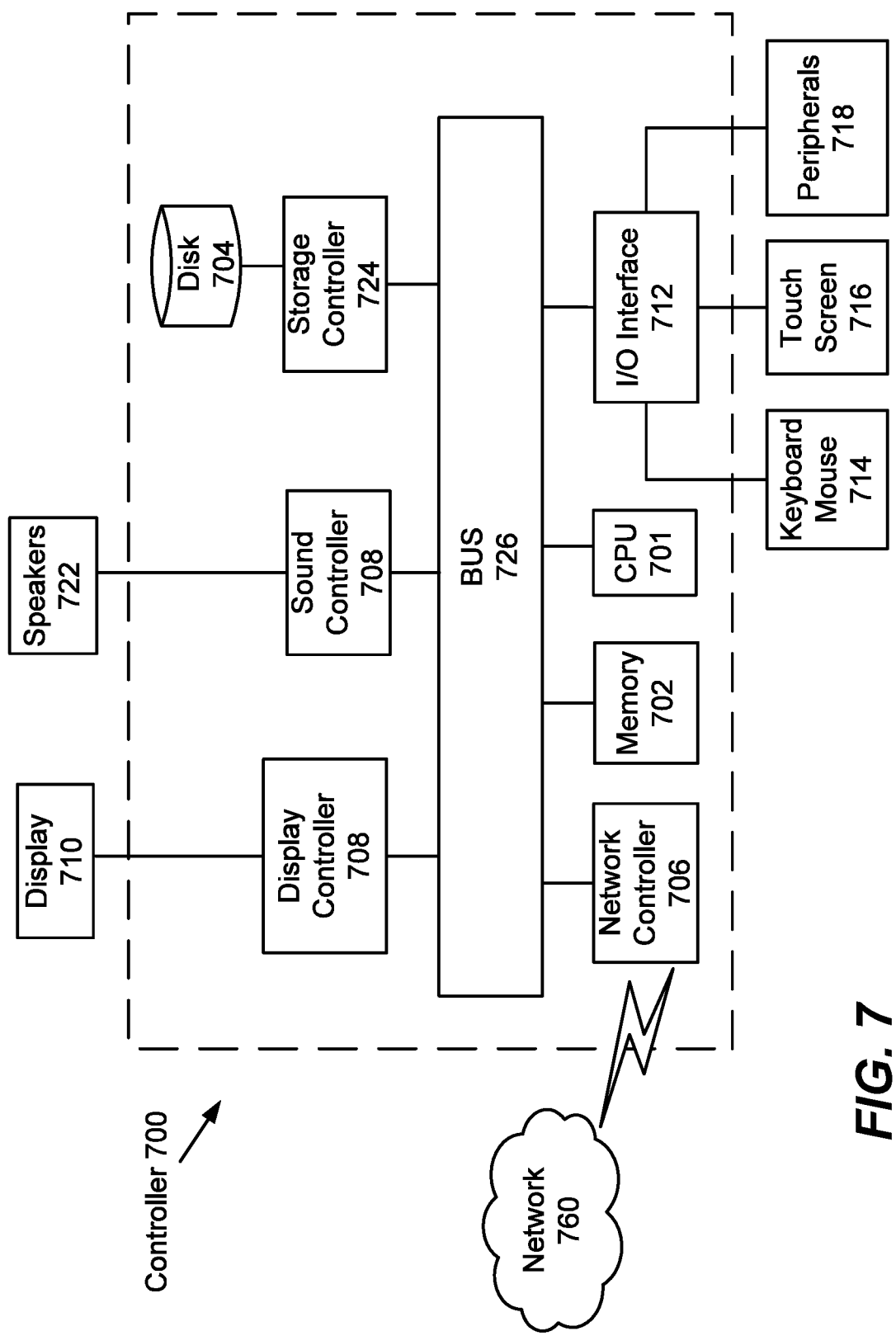
FIG. 7 is an illustration of a non-limiting example of details of computing hardware used in the computing system, according to certain embodiments.

Next, further details of the hardware description of the controller 600 according to exemplary embodiments is described with reference to FIG. 7. In FIG. 7, the controller 700 is described is representative of the controller 600 in which the controller is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 701 and an operating system such as Microsoft Windows 7, UNI7, Solaris, LINU7, Apple MAC-OS and other systems known to those skilled in the art.

The hardware elements in order to achieve the computing device may be realized by various circuitry elements, known to those skilled in the art. For example, CPU 701 may be a Xenon or Core processor from Intel of America or an Opteron processor from AMD of America, or may be other processor types that would be recognized by one of ordinary skill in the art. Alternatively, the CPU 701 may be implemented on an FPGA, ASIC, PLD or using discrete logic circuits, as one of ordinary skill in the art would recognize. Further, CPU 701 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN subnetworks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GT7 or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster 7-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
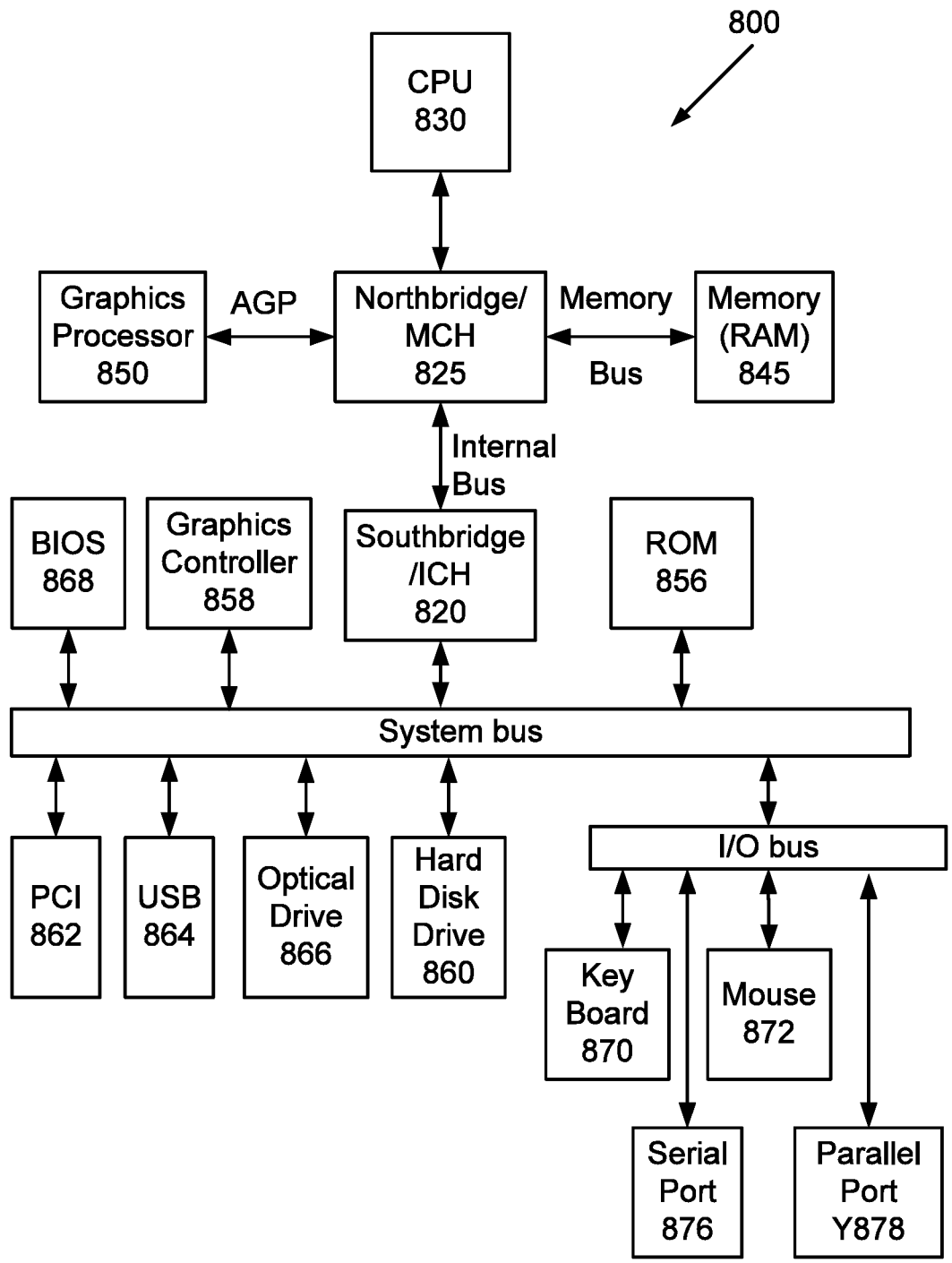
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
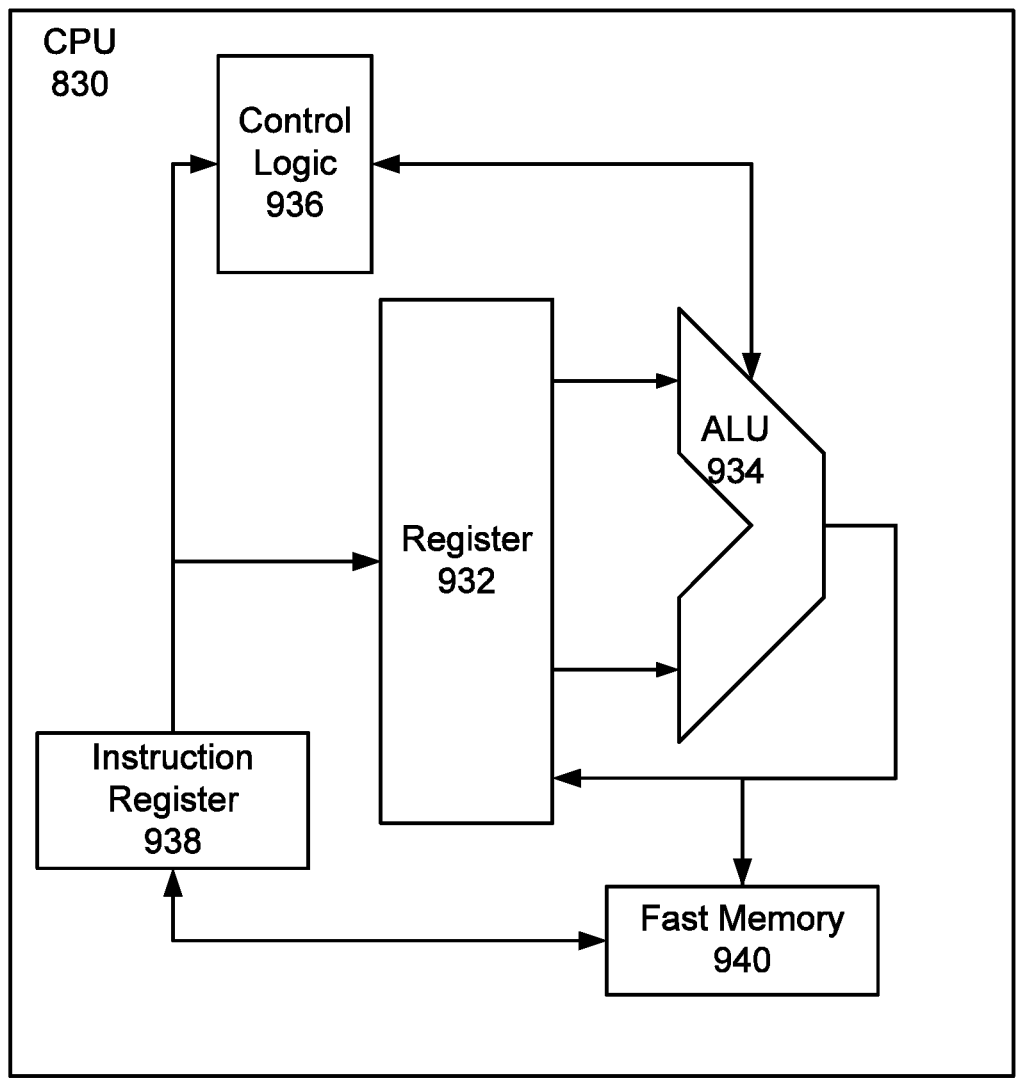
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
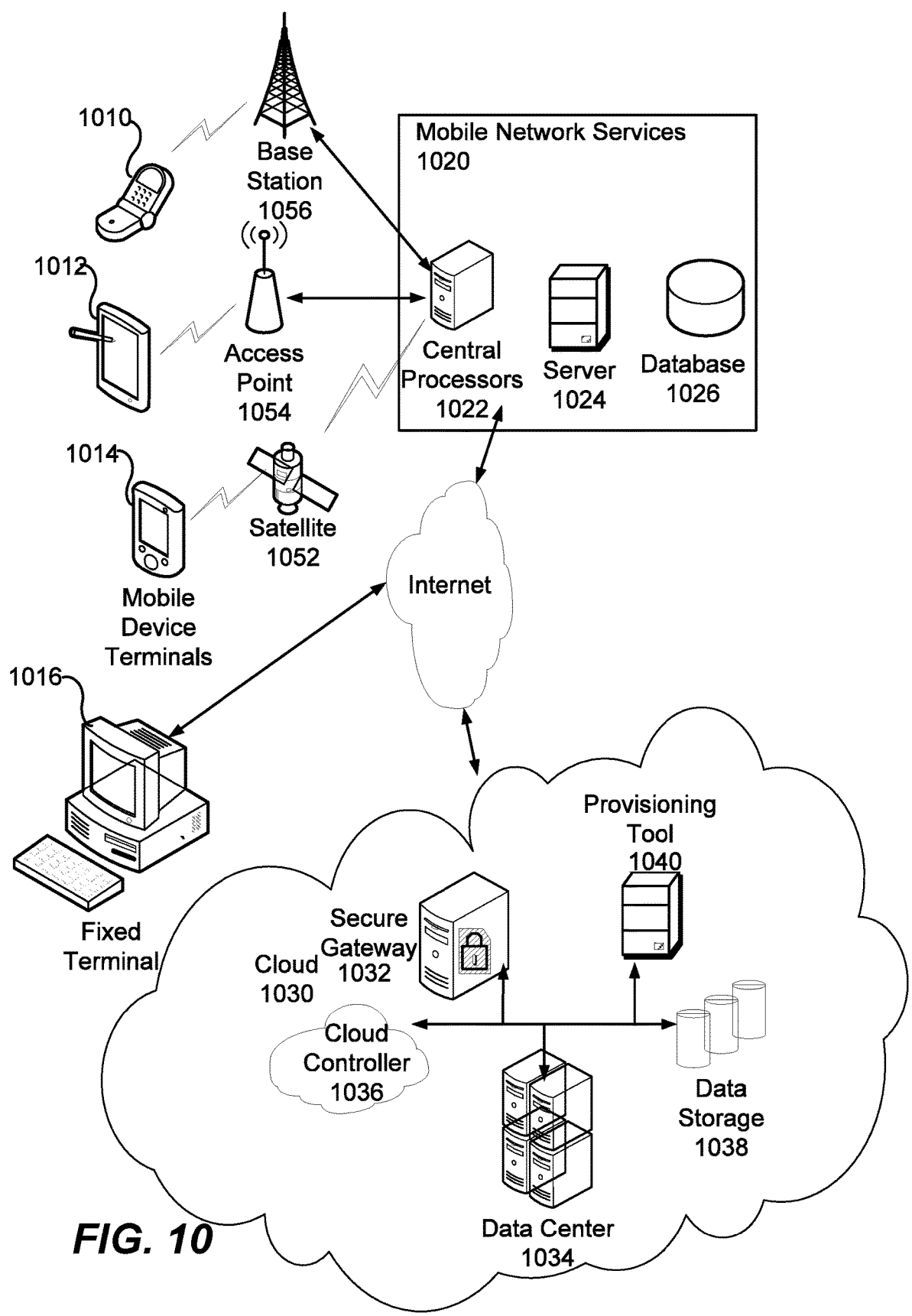
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A cyclic transportation method for vehicle travel on a route, comprising:

carrying out maintenance on a number of vehicles $x_j$ assigned to a maintenance day pattern j, for j=1, . . . , 7, of a total number of vehicles Z assigned to the route;

receiving, by a computing machine including a computer readable memory storing program instructions and at least one processor configured to implement the program instructions, the total number of vehicles Z assigned to the route;

receiving, by the computing machine, an objective of minimizing Z;

converting, by the at least one processor, the objective of minimizing Z to an objective of minimizing a cost function $W_s$, which equals a sum of the number of vehicles $x_j$ assigned to the maintenance day pattern;

receiving, by the computing machine, a set of known requirements $r_i$ for a number of vehicles required on a travel day i to travel on the route, for i=1, 2, . . . , 7;

receiving, by the at least one processor, a cyclic 0–1 7×7 constraint matrix A having coefficients $a_{ij}$, wherein each coefficient $a_{ij}$ equals 1, if day i is a travel day for the maintenance days pattern j, otherwise $a_{ij}$ equals 0;

constructing, by the at least one processor, a dual linear cost function $W_d$ from the cost function $W_s$, wherein $W_d$ equals a sum of each known requirement $r_j$ multiplied by a dual variable $y_j$, subject to constraints $\Sigma_{j=1}^{7} a_{ij}^T y_j \leq 1$, where T represents a transpose, and $y_j \geq 0$;

maximizing the cost function $W_d$ by:

identifying, by the at least one processor, a total of 7 dual variables;

determining, by the at least one processor, at least one set of m basic non-zero dual variables from the 7 dual variables;

identifying, by the at least one processor, each set of the m basic non-zero dual variables which is a potential dominant solution;

determining, by the at least one processor, a maximum number of non-zero coefficients $L_m$ in each potential dominant solution; and determining, by the at least one processor, the best sets of the m basic non-zero dual variables $SV_m$ by adding a constraint $\Sigma_{j \in SV_m} V_j \leq L_m - 1$ to each set and determining a ratio $m/L_m$ for each set, wherein the best sets are those with a highest ratio of $m/L_m$, wherein the best sets provide a set of dominant solutions which determine a minimum cost of the total number of vehicles Z, including the vehicles receiving maintenance, while ensuring that a required number of vehicles run on the route each day.

2. The method of claim 1, further comprising:

comparing, by the at least one processor, the dominant solutions such that:

when the first dominant solution is a subset of a second dominant solution and $L_1$ of the first solution equals $L_2$ of the second solution, the second solution dominates the first solution; and when a sum of a first dominant solution and a second dominant solution equals a third solution $L_3$ and $L_3$ equals a sum of $L_1$ and L2, the first and second dominant solutions dominate the third solution.

3. In a network comprising a plurality of nodes in a machine environment having a cyclic production schedule in which machines are operated during ON (binary 1) hours and sleep during OFF (binary 0) hours in a 24 hour workday, the improvement consisting of:

scheduling data packet transmission through the plurality of nodes by:

receiving, by a computing machine including a computer readable memory storing program instructions and at least one processor configured to implement the program instructions, a total number of data packets Z;

receiving, by the computing machine, an objective of minimizing Z;

converting, by the at least one processor, the objective of minimizing Z to an objective of minimizing a cost function $W_s$, which equals a sum of the number of nodes $x_j$ assigned to the sleep pattern, for j=1, . . . , 6;

receiving, by the computing machine, a set of known requirements $r_i$ which equals a number of nodes required to transmit during a transmit time window of 60 seconds, wherein each transmit time is 10 seconds, such that i=1, . . . , 6;

receiving, by the at least one processor, a cyclic 0–1 6×6 constraint matrix, A, having coefficients, $a_{ij}$, wherein each coefficient, $a_{ij}$, equals 1, if i is an open transmit time window j, otherwise $a_{ij}$ equals 0;

constructing, by the at least one processor, a dual linear cost function, $W_d$, from the cost function $W_s$, wherein $W_d$ equals a sum of each known requirement, $r_j$, multiplied by a dual variable, $y_j$, subject to constraints $\Sigma_{j=1}^{n} a_{ij}^T y_j \leq 1$, where T represents a transpose and $y_j \geq 0$;

maximizing the cost function $W_d$ by:

identifying, by the at least one processor, a total of 6 dual variables;

determining, by the at least one processor, at least one set of m basic non-zero dual variables from the 6 dual variables;

identifying, by the at least one processor, each set of the m basic non-zero dual variables which is a potential dominant solution;

determining, by the at least one processor, a maximum number of non-zero coefficients ($L_m$) in each potential dominant solution;

determining, by the at least one processor, the best sets of the m basic non-zero dual variables ($SV_m$) by adding a constraint $\Sigma_{j \in SV_m} V_j \leq L_m - 1$ to each set and determining a ratio $m/L_m$ for each set, wherein the best sets are those with a highest ratio of $m/L_m$, wherein the best sets provide a set of dominant solutions which determine the minimum Z, wherein the minimum Z, represents a minimum number of nodes which must be active to transmit all of the data packets during the transmit time window defined by i=1, . . . , 6.

4. The method of claim 3, further comprising:

comparing, by the at least one processor, the dominant solutions such that:

when the first dominant solution is a subset of a second dominant solution and $L_1$ of the first solution equals $L_2$ of the second solution, the second solution dominates the first solution; and when a sum of a first dominant solution and a second dominant solution equals a third solution $L_3$ and $L_3$ equals a sum of $L_1$ and L2, the first and second dominant solutions dominate the third solution.

\* \* \* \* \*